Aug. 19, 1941.   R. G. SARVER   2,252,787
GLASS CLEANING APPARATUS
Filed May 25, 1938    2 Sheets-Sheet 1

Inventor
ROGER G. SARVER.
By Frank Fraser
Attorney

Aug. 19, 1941.   R. G. SARVER   2,252,787
GLASS CLEANING APPARATUS
Filed May 25, 1938   2 Sheets-Sheet 2

Inventor
ROGER G. SARVER.
By Frank Fraser
Attorney

Patented Aug. 19, 1941

2,252,787

UNITED STATES PATENT OFFICE 2,252,787

GLASS CLEANING APPARATUS

Roger G. Sarver, Toledo, Ohio, assignor to Libbey-Owens-Ford Glass Company, Toledo, Ohio, a corporation of Ohio Application May 25, 1938, Serial No. 209,860

4 Claims. (Cl. 15—21)

The present invention relates broadly to the manufacture of laminated safety glass and more particularly to improved apparatus for cleaning or washing the edges of the laminated glass during the manufacture thereof.

Laminated safety glass generally comprises two or more sheets of glass and one or more interposed plastic membranes bonded together to form a composite structure. With some types of laminated glass, it is customary to seal the edges thereof in order to protect the plastic lamination or laminations from the atmosphere. This sealing operation usually consists in first forming a continuous channel around the edges of the laminated sheet by removing the plastic material for a short distance in from the edges thereof and in then filling this channel with a suitable sealing material, such as pitch or other weather resistant substance. A surplus amount of sealing material is preferably supplied to the channel in order to insure its being completely filled and as a result a certain portion of this material adheres to the peripheral edges of the glass sheets as well as to the marginal portions of the outer faces thereof.

It is an aim of this invention to provide an improved form of apparatus for cleaning or washing the edges of laminated sheets of glass subsequent to the sealing thereof in order to remove all surplus sealing material. This is accomplished according to the invention by the provision of a plurality of rotary cleaning brushes adapted to engage the edges of the laminated sheet and so arranged with respect to one another that they will act to remove the surplus sealing material not only from the peripheral edges of the glass sheets but also from the marginal portions of the outer faces thereof in a thoroughly practical and efficient manner.

Other objects and advantages of the invention will become more apparent during the course of the following description, when taken in connection with the accompanying drawings.

In the drawings, wherein like numerals are employed to designate like parts throughout the same:

Figure 1:
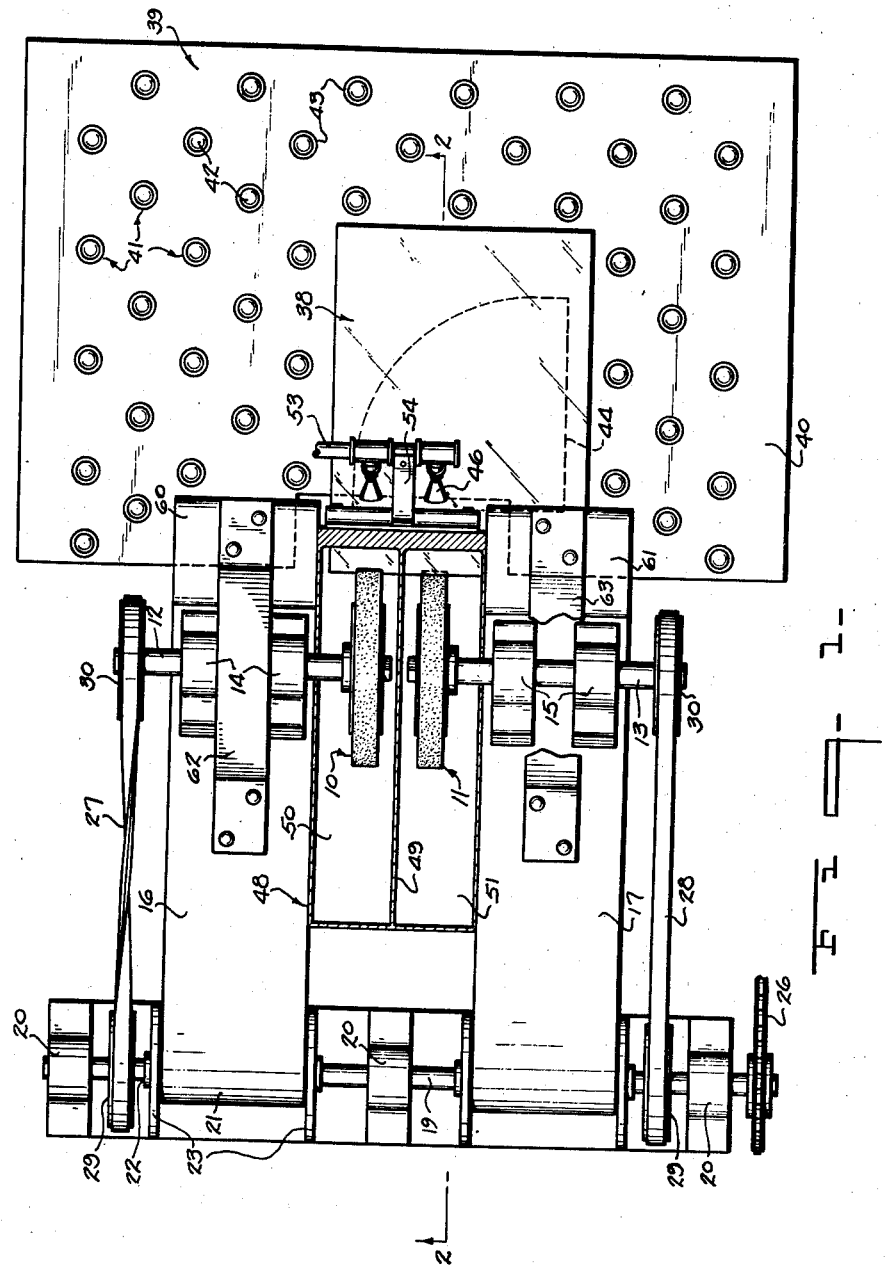
Fig. 1 is a plan view of cleaning apparatus constructed in accordance with the invention.
Figure 2:
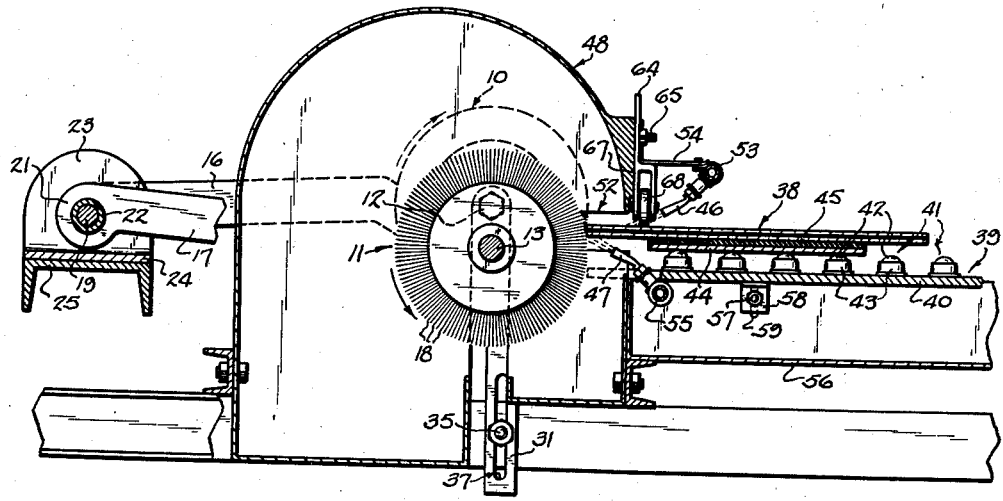
Fig. 2 is a vertical longitudinal section through the apparatus taken substantially on line 2—2 of Fig. 1.

With reference now to the drawings, the apparatus embodies preferably a pair of rotatable cleaning or washing brushes 10 and 11 carried upon the inner ends of horizontal shafts 12 and 13, said shafts being journaled in bearings 14 and 15 mounted upon the inner ends of substantially horizontal supporting arms 16 and 17 respectively. The rotary brushes 10 and 11 are provided with the radially extending bristles 18 and, while these bristles are preferably of wire or other metal, they may, of course, be formed of fiber if desired. The brushes 10 and 11 are arranged side by side relatively close to one another, and in operation the horizontal shafts 12 and 13 carrying the said brushes are adapted to be vertically offset with respect to one another as clearly shown in Fig. 4 and the purpose of which will be more fully hereinafter described.

The supporting arms 16 and 17 are pivotally mounted at their outer ends upon a horizontal drive shaft 19 journaled at its opposite ends and also intermediate its ends, if desired, in suitable bearings 20. The outer end of each supporting arm 16 and 17 is formed with a horizontal bearing portion 21 in which is inserted a bushing 22 through which the shaft 19 extends; said bushing being supported at its opposite ends in vertical flanges 23 formed integral with a horizontal plate 24 mounted upon and secured to a channel beam 25 to which the said bearings 20 are also secured.

The shaft 19 is adapted to be positively driven by any suitable drive mechanism, such as for example a chain and sprocket drive or the like 26, and the rotation of shaft 19 is transmitted to the brush shafts 12 and 13 by belts or the like 27 and 28 respectively, each belt being trained about a pulley 29 fixed to shaft 19 and about a pulley 30 fixed to the respective brush shaft 12 or 13. The belt 27 is shown as being a cross belt and the belt 28 a straight belt so that, upon rotation of drive shaft 19, the brush shafts 12 and 13 and brushes 10 and 11 carried thereby will be driven in unison but in opposite directions as indicated by the arrows in Fig. 4. The invention is of course not limited to the particular means herein disclosed for driving the brushes.

Figure 3:
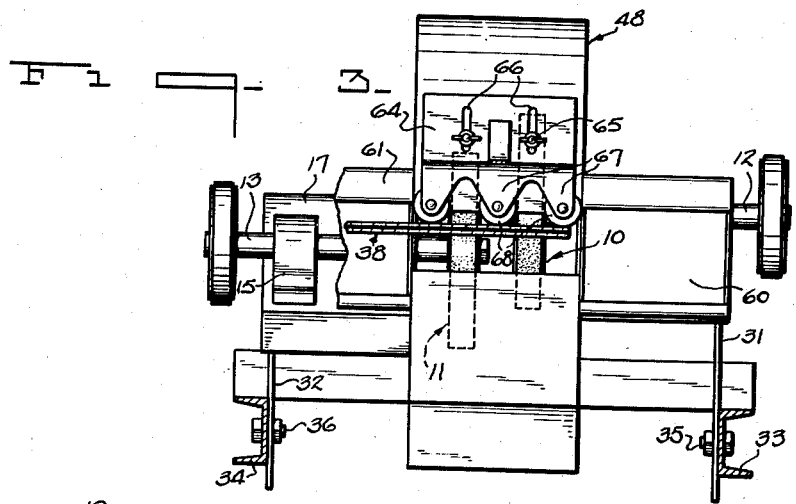
Fig. 3 is a front view of the apparatus, with the supporting table removed for the sake of clearness.

The supporting arms 16 and 17 are supported at their inner ends by vertical straps 31 and 32 (Fig. 3) connected at their upper ends to the said arms and at their lower ends to horizontal channel beams 33 and 34 by bolts or other fastening means 35 and 36 respectively. Each strap 31 and 32 is provided with a vertical slot 37 through which the respective fastening means 35 or 36 passes. Due to the provision of the slots 37 the straps 31 and 32 can be moved upwardly or downwardly to raise or lower the cleaning brushes 10 and 11 independently of one another.

The laminated sheet of glass to be cleaned is indicated by the numeral 38 and during the cleaning thereof it is adapted to be supported horizontally upon a horizontal table 39 mounted in front of the cleaning brushes 10 and 11. The table 39 here shown comprises a stationary top plate 40, the upper surface of which is provided with a plurality of roller supports 41. The supports 41 as disclosed preferably consist of a plurality of relatively large balls 42 freely rotatable in housings 43 so that they can rotate in any direction. Other types of tables might also be employed.

Instead of laying the laminated sheet 38 directly upon the balls 42, it is preferred that it be carried upon a plate 44. The plate 44 may be of any thin metal and it is also desirable to interpose a cushion 45 between the plate and sheet of laminated glass to prevent scratching or marring of the latter. By arranging a sufficient number of ball supports 41 on the table, the supporting plate 44 can be moved easily and quickly over any portion thereof, and likewise the said supporting plate can be swung around with complete freedom to present all of the edges of the laminated sheet 38 to the action of the cleaning brushes.

Figure 4:
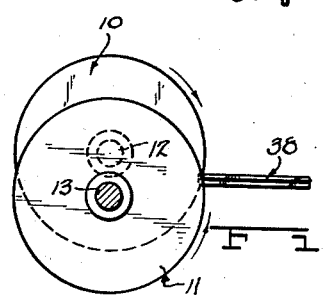
Fig. 4 is a diagrammatic view illustrating the novel arrangement of the cleaning brushes relative to one another.

In operation, the sheet of laminated glass 38 to be edge-cleaned is laid horizontally upon the supporting plate 44 and the said plate then moved over the roller supports 41 to bring one edge of the laminated sheet into engagement with the cleaning brushes 10 and 11 as indicated in Fig. 4. Due to the provision of the roller supports 41 and plate 44, the operator can move the laminated sheet transversely with respect to the cleaning brushes to clean the entire edge thereof, and as soon as one edge is cleaned, the sheet can be swung around horizontally and the remaining edges thereof cleaned in the same manner.

As pointed out above and as best illustrated in Fig. 4, the shafts 12 and 13 for the brushes 10 and 11 respectively are vertically offset with respect to one another and this novel arrangement provides for a more thorough cleaning, not only of the peripheral edges of the laminated sheet, but also the marginal portions of the upper and lower faces of the said sheet whereby all of the surplus sealing material will be effectively removed. Thus, as the cleaning brushes rotate in opposite directions, as indicated by the arrows in Fig. 4, the bristles 18 of the upper brush 10 will act to clean the marginal portion of the upper face of the sheet, while the bristles of the lower brush 11 will act to clean the marginal portions of the lower face of the sheet. In other words, the cleaning brushes are adapted to rotate in opposite directions about substantially horizontal axes which are vertically offset but substantially parallel with one another.

In cleaning the surplus sealing material from the edges of the laminated sheets, it is preferred that a suitable cleaning fluid, such as water, be supplied to the brushes to facilitate the cleaning or washing action thereof and to this end spray nozzles 46 and 47 can be provided above and beneath the table 39 for supplying the desired cleaning fluid to the brushes. To prevent undue splashing or frying of the cleaning fluid, the brushes may be housed in a casing 48 having a central partition 49 providing separate chambers 50 and 51 in which the brushes 10 and 11 respectively are arranged. The front wall of the casing 48 is provided with a horizontal slot 52 through which the liminated sheet 38 to be cleaned can be moved to engage the brushes.

The upper spray nozzles 46 are carried by and communicate with a supply pipe 53 supported by a bracket 54 secured to the casing 48. The lower spray nozzles 47 are carried by and communicate with a supply pipe 55 which may be supported at its ends in the opposite side walls of a tank 56 arranged beneath the table 39 for catching therein any surplus cleaning fluid. The top 40 of the table may also be fastened to the side walls of tank 56 by bolts or the like 57 which pass through brackets 58 carried by the table top and are received in vertical slots 59 in the side walls of said tank. In this manner, the said table top can be raised and lowered as desired. To further minimize splashing or flying of the cleaning fluids, suitable shields 60 and 61 can be arranged at opposite ends of the slot 52 and be fastened to the supporting arms 16 and 17 by straps 62 and 63 respectively.

In order to assist in holding down and guiding the sheet of laminated glass 38 during the cleaning thereof, there may be carried by the container 48 a vertical plate 64 secured to said container by bolts or other suitable fastening means 65 which pass through vertical slots 66 in said plate. The plate 64 is formed at its lower end with a plurality of yokes 67 and rotatably carried thereby are the freely rotatable hold-down rollers 68.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus of the character described for cleaning the edges of laminated sheets of glass, comprising a pair of rotatable cleaning brushes arranged side by side, horizontal shafts for supporting said brushes, means for driving said shafts, the said shafts being arranged in substantially the same vertical plane but in different horizontal planes, and means for supporting the laminated sheet to be cleaned horizontally including a table comprising a top, a plurality of roller supports carried by said top, and a supporting plate freely supported upon said roller supports and upon which the laminated sheet to be cleaned is adapted to be laid.

2. Apparatus of the character described for cleaning the edges of laminated sheets of glass, comprising a pair of rotatable cleaning brushes arranged side by side, horizontal shafts for supporting said brushes, means for driving said shafts, the said shafts being arranged in substantially the same vertical plane but in different horizontal planes, and means for supporting the laminated sheet to be cleaned horizontally including a table comprising a top, a plurality of roller supports carried by said top, a supporting plate freely supported upon said roller supports and upon which the laminated sheet to be cleaned is adapted to be laid, and a plurality of freely rotatable rollers arranged and adapted to engage the top surface of said glass for holding down and guiding the sheet of laminated glass during the cleaning thereof.

3. Apparatus of the character described for cleaning the edges of laminated sheets of glass, comprising a pair of rotatable cleaning brushes arranged side by side, horizontal shafts for supporting said brushes, means for driving said shafts, the said shafts being arranged in substantially the same vertical plane but in different horizontal planes, and means for horizontally supporting the laminated sheet to be cleaned including a table comprising a top and a plurality of roller supports carried by said top and constructed to provide for universal horizontal movement of the laminated sheet upon said table.

4. Apparatus of the character described for cleaning the edges of laminated sheets of glass, comprising a pair of rotatable cleaning brushes arranged side by side, separate horizontal shafts for carrying said brushes, means for mounting said shafts in substantially the same vertical plane but in different horizontal planes, means for horizontally supporting the sheet of laminated glass including a table comprising a top and a plurality of roller supports carried by said top for supporting the laminated sheet thereon and presenting the edge thereof to be cleaned to said brushes substantially intermediate the axes of rotation thereof, and means for driving said shafts in opposite directions so that the upper brush will also act to clean the marginal portion of the upper face of the laminated sheet while the lower brush will act to clean the marginal portion of the lower face of said laminated sheet.

ROGER G. SARVER.